(12) United States Patent
Kang et al.

(10) Patent No.: US 8,732,968 B2
(45) Date of Patent: May 27, 2014

(54) APPARATUS FOR MEASURING GEOLOGIC STRIKE AND DIP

(75) Inventors: Il-Mo Kang, Seoul (KR); Sung-Ja Choi, Daejeon (KR); Kyo-Young Song, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 211 days.

(21) Appl. No.: 13/480,285

(22) Filed: May 24, 2012

(65) Prior Publication Data

US 2013/0239422 A1 Sep. 19, 2013

(30) Foreign Application Priority Data

Mar. 19, 2012 (KR) .................. 10-2012-0027711

(51) Int. Cl.
*E21B 47/00* (2012.01)
*G01C 17/04* (2006.01)

(52) U.S. Cl.
USPC .............. 33/1 E; 33/355 R; 33/354

(58) Field of Classification Search
CPC ....... G01C 17/02; G01C 17/04; E21B 47/026
USPC .............. 33/1 E, 1 R, 354, 355 D, 355 R
See application file for complete search history.

(56) References Cited

U.S. PATENT DOCUMENTS

| 2,914,862 | A | * | 12/1959 | Hendriks | 33/355 R |
|---|---|---|---|---|---|
| 6,516,526 | B1 | * | 2/2003 | Iden | 33/355 R |
| 8,393,086 | B1 | * | 3/2013 | Kihm | 33/355 R |
| 2002/0083604 | A1 | * | 7/2002 | Iden | 33/1 E |
| 2010/0095878 | A1 | * | 4/2010 | Kilgus | 33/355 R |
| 2013/0014398 | A1 | * | 1/2013 | Iden | 33/355 R |

FOREIGN PATENT DOCUMENTS

| JP | 1999-044537 A | 2/1999 |
|---|---|---|
| KR | 0130506 Y1 | 3/1999 |

* cited by examiner

*Primary Examiner* — G. Bradley Bennett
(74) *Attorney, Agent, or Firm* — Kile Park Reed & Houtteman PLLC

(57) ABSTRACT

An apparatus for measuring geologic strike and dip of a formation. The apparatus includes a support plate, a first rotation plate disposed on the support plate and parallel to the support plate, the first rotation plate being rotatable parallel to the support plate, a second rotation plate hinge-coupled to the first rotation plate, the second rotation plate being rotatable about a hinge shaft, a protractor configured to read an angle between the first rotation plate and the second rotation plate; and a measuring unit including a compass disposed on the second rotation plate.

12 Claims, 4 Drawing Sheets

APPARATUS FOR MEASURING GEOLOGIC STRIKE AND DIP

CROSS-REFERENCE TO RELATED APPLICATION

This application claims priority to Korean Patent Application No. 10-2012-0027711 filed on Mar. 19, 2012 and all the benefits accruing therefrom under 35 U.S.C. §119, the contents of which are incorporated by reference in their entirety.

BACKGROUND

The present disclosure relates to an apparatus for measuring geologic strike and dip. More particularly, the disclosure relates to an apparatus for facilely measuring strike and dip of a bedding plane and an auxiliary apparatus for measuring strike and dip.

Strike and dip refer to the attitude of a geologic formation. Structural geology uses measurements of present day rock geometries to determine the history of deformation in various geologic strata. In general, a direction of an intersection defined by a bedding plane and a horizontal plane is referred to as strike, and an angle between the bedding plane and the horizontal plane is referred to as dip. In field work, strike is typically measured by supporting a side surface of a compass on the bedding plane and leveling the compass to read a North direction of the compass. Also dip is measured by locating an inclinometer in a direction perpendicular to the horizontal plane to read an angle of the inclinometer.

One popular device for field mapping geological formation strata is known as a Brunton compass. When strike is measured, however, it is difficult to support only the side surface of the compass to maintain a horizontal posture of the compass. Also, when dip is measured, it is difficult to maintain the state in which an inclinometer is vertically disposed with respect to the horizontal plane. Thus, it is often difficult to reproducibly and conveniently measure strike and dip using merely a compass and inclinometer. In addition it is inconvenient to separately and respectively measure strike and dip.

SUMMARY

The present disclosure provides an apparatus for measuring geologic strike and dip which can reproducibly and conveniently measure strike and dip at the same time.

The present disclosure also provides an auxiliary apparatus for measuring strike and dip which can reproducibly and conveniently measure strike and dip at the same time.

In accordance with an exemplary embodiment, an apparatus for measuring strike and dip includes: a support plate; a first rotation plate disposed on the support plate and parallel to the support plate, the first rotation plate being rotatable parallel to the support plate. A second rotation and pivot plate is hinge-coupled to the first rotation plate and the second rotation and pivot plate is rotatable about a hinge shaft. A protractor is configured to read an angle between the first rotation plate and the second rotation plate and a measuring unit including a compass disposed on the second rotation plate.

The measuring unit further includes an X-Y plane level gauge configured to confirm horizontal posture of the second rotation and pivot plate and a parallel posture of a strike line with a horizontal geologic plane. A protractor may be disposed on a side surface of the hinge shaft. A support plate has graduations along a circumference of the first rotation plate to confirm a rotation angle of the first rotation plate with respect to the support plate.

The apparatus may further include one or more auxiliary plates disposed parallel and rotatably connected to the support plate. The auxiliary plate is configured to assist the support plate so that the support plate is disposed parallel to a bedding plane.

In accordance with another exemplary embodiment, an auxiliary apparatus for measuring geologic strike and dip includes: a support plate; a first rotation plate disposed on the support plate and parallel to the support plate, the first rotation plate is rotatable parallel to the support plate about an axis normal to the first rotation plate and the support plate. A second rotation and pivot plate is hinge-coupled to the first rotation plate and rotated about a hinge shaft. The hinge shaft extends through and perpendicular to a central rotation axis projecting normal to the first rotation plate. The second rotation plate is configured to support a measuring unit and a protractor is vertically disposed with respect to the first rotation plate. The protractor is configured to confirm an angle between the first rotation plate and the second rotation plate and is mounted on a side surface of the hinge shaft.

A support plate may have graduations along a circumference of the first rotation plate to confirm a rotation angle of the first rotation plate with respect to the support plate when the hinge axis is parallel to a geologic horizontal plane.

The auxiliary apparatus may further include an auxiliary plate disposed parallel and rotatably connected to the support plate, the auxiliary plate is configured to assist the support plate so that the support plate is disposed parallel to a bedding plane. The second rotation plate may further include an attachment member configured to releasably connect the measuring unit to the support plate.

BRIEF DESCRIPTION OF THE DRAWINGS

Exemplary embodiments will be understood in more detail from the following description taken in conjunction with the accompanying drawings, in which:

FIG. 5 is positioned on a bed in a mirror image posture of the apparatus shown in FIG. 4;

DETAILED DESCRIPTION OF EMBODIMENTS

Context of the Invention

Geological features of bed planes, fold axes, faults and other geologic structures can be described using measurements of strike and dip.

Figure 1:
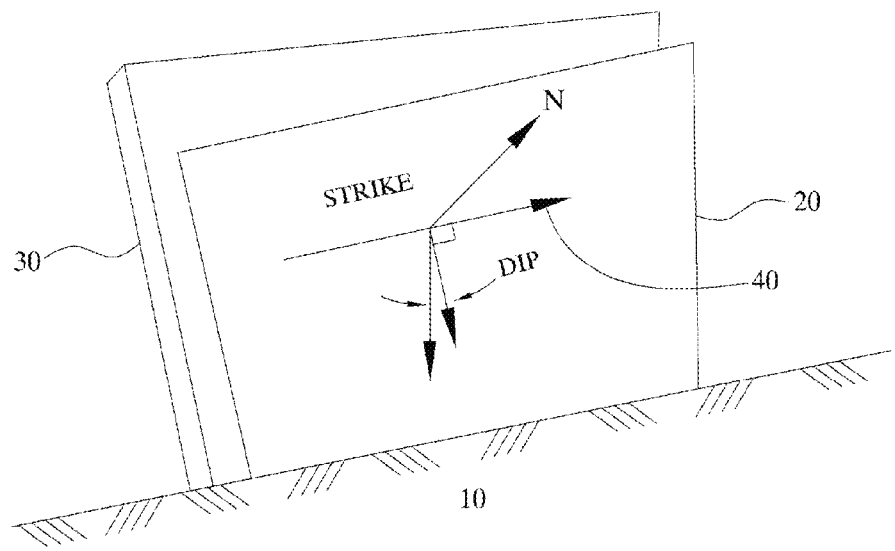
FIG. 1 is a pictorial illustration of a geological outcropping where it is desirable to measure strike and dip values for the formation.

In FIG. 1 a generally horizontal ground earth surface 10 has an outcropping of rock strada or beds 20 and 30. Strike is a measure of an angle created between a strike line 40 on the rock strada 20 drawn parallel to a horizontal ground surface and magnetic North as determined by a compass.

Figure 2:
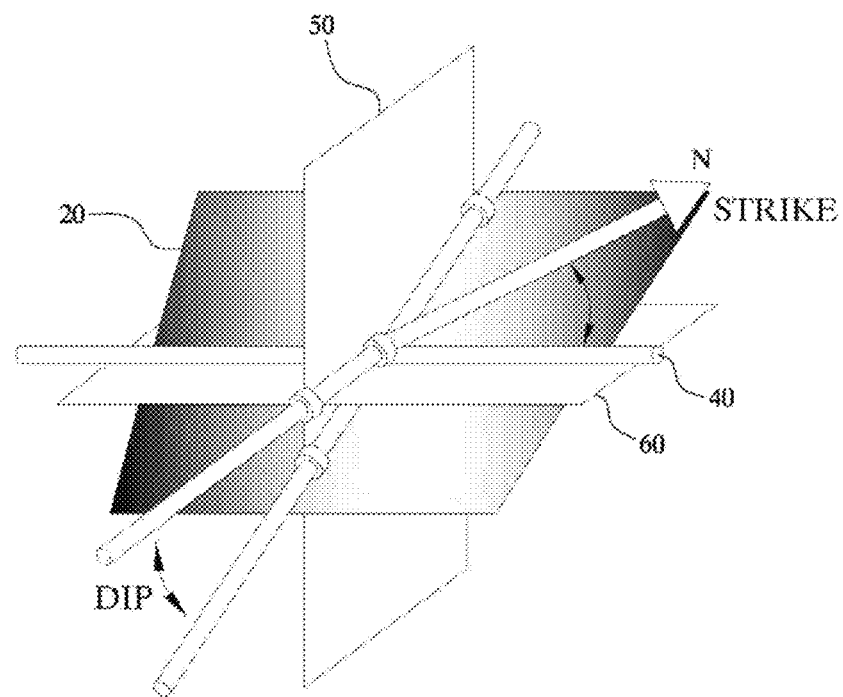
FIG. 2 is a graphic representation of a geologic plane similar to a rock formation plane depicted in FIG. 1 with an addition of imaginary horizontal and vertical planes with lines depicting strike and dip for the exposed formation.

As shown in FIG. 2 dip is an angle within a plane 50 that is vertical to a horizontal plane 60 extending through the strike line 40. The dip angle is an angle in the vertical plane 50 from the horizontal plane 60 extended down to the line of intersection of the vertical plane 50 with the geologic strata bedding 20. Dip is perpendicular to strike and has both a compass direction and an angle. Structural geologists designate strike 15 degrees East of North and having a dip 20 degrees Southeast as N15E, 20SE.

Strike and Dip Measurement Apparatus

An apparatus for measuring strike and dip and an auxiliary apparatus for measuring strike and dip in accordance with an exemplary embodiment will be described in detail with reference to the accompanying drawings. Since the present disclosure may have diverse modified embodiments, preferred embodiments are illustrated in the drawings and are described in the detailed description of the invention. However, this does not limit the present disclosure to these specific embodiments and it should be understood that the present disclosure covers all the modifications, equivalents, and replacements within the idea and technical scope of the present disclosure. In a description of the drawings, like reference numerals in the drawings denote like elements. In the drawings, dimensions of structures may be enlarged or exaggerated for clarity.

It will be understood that although the terms of first and second are used herein to describe various elements, these elements should not be limited by those terms. Terms are only used to distinguish one component from other components. Therefore, a component referred to as a first component in one embodiment can be referred to as a second component in another embodiment.

In the following description, the technical terms are used only for explaining a specific exemplary embodiment while not limiting the present disclosure. The terms of a singular form may include plural forms unless as statement is made to the contrary. The meaning of 'include' or 'comprise' specifies a property, a numeral, a step, an operation, an element or a combination thereof, but does not exclude other properties, numerals, steps, operations, elements or combinations thereof.

Unless terms used in the present invention are defined differently, the terms should be construed with a meaning known to those skilled in the art. Terms such as, for example strike and dip should be construed as having meanings matched with contextual meanings in the art.

Figure 3:
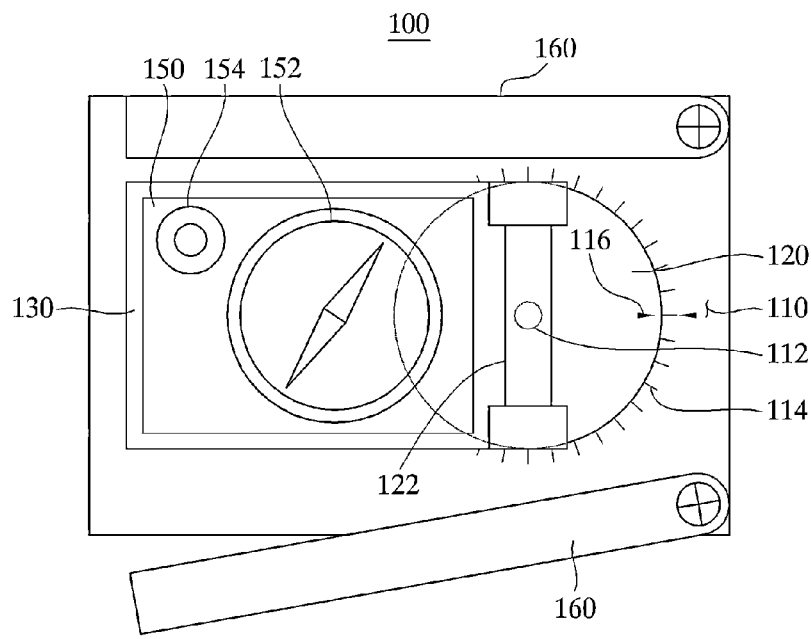
FIG. 3 is a plan view of an apparatus for measuring strike and dip in accordance with an exemplary embodiment.
Figure 4:
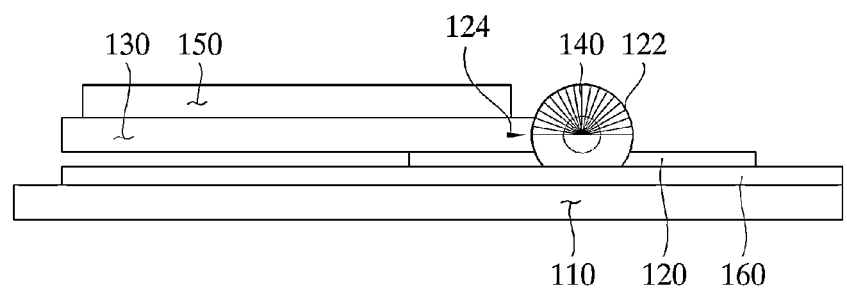
FIG. 4 is a side view of the apparatus for measuring strike and dip shown in FIG. 3.
Figure 5:
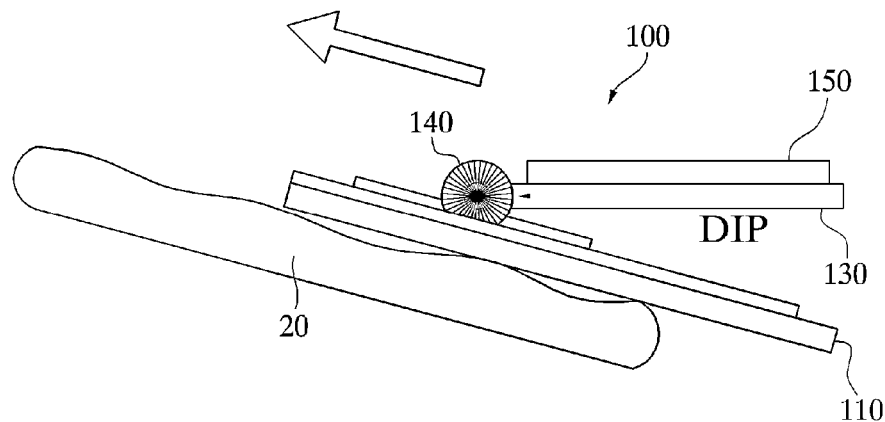
FIGS. 5 and 6 are views of a state in which the apparatus for measuring strike and dip of FIG. 3 is placed on a bedding plane where
Figure 6:
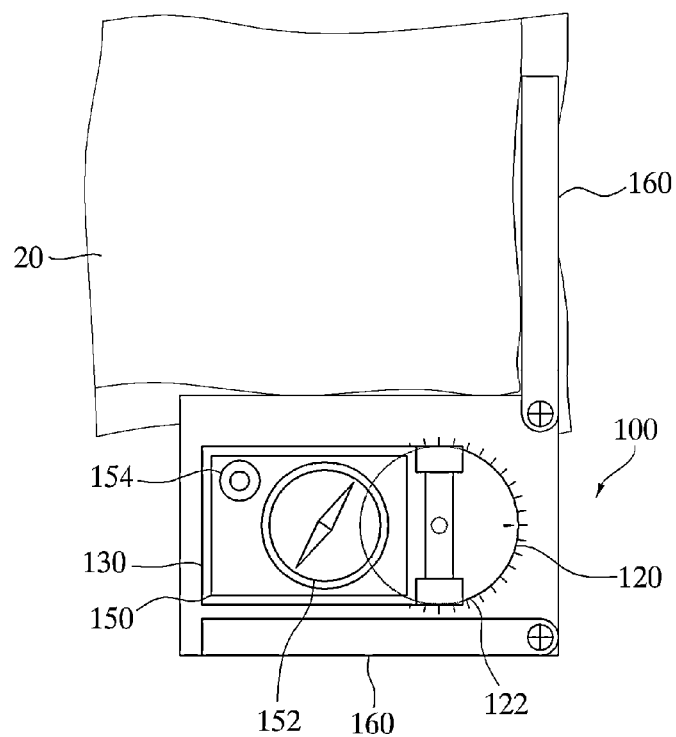

FIG. 3 is a plan view of an apparatus for measuring geological strike and dip in accordance with an exemplary embodiment. FIG. 4 is a side view of the apparatus for measuring strike and dip disclosed in FIG. 3. FIGS. 5 and 6 are views of a state in which the apparatus for measuring strike and dip of FIG. 3 is placed on a bedding plane.

Referring now specifically to FIGS. 3 to 6, an apparatus 100 for measuring geological strike and dip includes a support plate 110, a first rotation plate 120, a second rotation and pivot plate 130, a protractor 140, a measuring unit 150, and auxiliary plates 160.

The support plate 110 may have various geometric plate shapes. For example, the support plate 110 may have a square plate shape. Thus, the support plate 110 may contact a bedding plane 20 and be disposed parallel to the bedding plane 20.

The first rotation plate 120 is disposed parallel to the support plate 110 and is mounted on the support plate 110. The first rotation plate 120 is circular and rotatably connected to the support plate 110. The first rotation plate 120 and the support plate 110 are connected to each other by a central rotation shaft 112 mounted on the support plate 110 and extends perpendicular to the support plate 110 and the first rotation plate 120. Thus, the first rotation plate 120 may be rotated parallel to the support plate 110.

The first rotation plate 120 may have a circular plate shape and thus be easily fixed. Here, a perpendicular rotation shaft 112 is connected to a center location of the first rotation plate 120. Alternatively, the first rotation plate 120 may have various plate shapes such as a semicircular or polygonal plate shape.

The support plate 110 has graduations 114 marked along a circumference of the first rotation plate 120. Thus, a rotation angle of the first rotation plate 120 with respect to the support plate 110 may be easily determined using the graduations 114. A base line marker graduation combination 116 may be displayed on each of the first rotation plate 120 and the support plate 110 to confirm an angle between the base lines, thereby more easily confirming the rotation angle of the first rotation plate 120.

The second rotation and pivot plate 130 is disposed on the first rotation plate 120 and is hinge-coupled to pivot with respect to the first rotation plate 120. The second rotation plate 130 may have a rectangular plate shape. Also, the second rotation plate 130 has a side surface hinge-coupled to the first rotation plate 120. The second rotation plate 130 is mounted to pivot around a hinge shaft 122. When the first rotation plate 120 has a circular plate shape, the hinge shaft 122 may be disposed crossing a diameter of the first rotation plate 120 and an imaginary central longitudinal axis of the hinge shaft 122 intersects at a right angle an imaginary central longitudinal axis of the rotation shaft 112.

Each of the first and second rotation plates 120 and 130 may be adjusted in rotation in a state where the support plate 110 is placed on the bedding plane 20 to dispose the second rotation plate 130 parallel to a horizontal plane. The horizontal plane may be a virtual sea level, i.e., a virtual plane perpendicular to the direction of gravity. Since the support plate 110 is disposed on the bedding plane 20 and parallel to the first rotation plate 120, the bedding plane 20 is parallel to the first rotation plate 120. When the second rotation plate 130 is disposed parallel to the horizontal plane, an angle between the first rotation plate 120 and the second rotation plate 130 is equal to that between the bedding plane 20 and the horizontal plane. That is, an angle between the first rotation plate 120 and the second rotation plate 130 is the dip measurement of the bedding plane 20.

When the second rotation plate 130 is disposed parallel to the horizontal plane, the protractor 140 affixed to the hinge shaft 122 reads an angle between the first rotation plate 120 and the second rotation plate 130. Since the angle between the first rotation plate 120 and the second rotation and pivot plate 130 is equal to the dip of the bedding plane 20. The dip of the bedding plane 20 may be determined by reading the angle between the first rotation plate 120 and the second rotation plate 130.

The protractor 140 may be vertically disposed with respect to the first rotation plate 120. For example, the protractor 140 may be disposed on a side surface of the hinge shaft 122. The protractor 140 is attached to a side surface of the hinge shaft 122, with graduations for measuring an angle directly displayed on the side surface of the hinge shaft 122. Here, a center of the protractor 140 is coaxially disposed with respect to an imaginary central longitudinal axis of the hinge shaft 122.

To easily measure the angle between the first rotation plate 120 and the second rotation plate 130, a base line 124 may be displayed on a side surface of the second rotation plate 130.

The measuring unit 150 includes a compass 152. The compass is disposed on the second rotation and pivot plate 130. When the second rotation and pivot plate 130 is disposed parallel to the horizontal plane, the compass 152 functions to measure a direction of an intersection between the first rotation plate 120 and the second rotation plate 130 with respect to North. As indicated above, since the bedding plane 20 and the first rotation plate 120 are parallel to each other, and a geological horizontal plane and the second rotation plate 130 are parallel to each other, the intersection between the first rotation plate 120 and the second rotation plate 130 is equal to the strike line of the bedding plane 20. The strike angle can be determined from the intersection between the first rotation plate 120 and the second rotation plate 130 as measured using the compass 152 on the basis of a magnetic North to measure the strike angle of the bedding plane 20.

The measuring unit 150 further includes an X-Y axis level gauge 154. The level gauge 154 is disposed on the second rotation and pivot plate 130. Thus, a horizontal posture of the second rotation plate 130 in an orientation where the hinge imaginary central longitudinal axis is perpendicular to the direction of gravity is precisely confirmed using the level gauge 154. The compass 152 and the level gauge 154 may be integrated with each other. Alternatively, the compass 152 and the level gauge 154 may be separately provided on the second rotation and pivot plate 130.

The measuring unit 150 may be fixed on the second rotation plate 130. Alternatively, the measuring unit 150 may be detachably disposed on the second rotation plate 130.

When the second rotation plate 130 is horizontally disposed as shown in FIG. 5, the first and second rotation plates 120 and 130 may be maintained in a rotated state so as to easily measure the rotation angle of the first rotation plate 120 with respect to the support plate 110 and the pivot angle between the first rotation plate 120 and the second rotation plate 130. The support plate 110 and the first rotation plate 120 are relatively firmly coupled to each other, and the first rotation plate 120 and the second rotation plate 130 are relatively firmly hinge-coupled to each other to maintain the rotated state of the first rotation plate 120 and the second rotation plate 130. Alternatively, each of the first and second rotation plates 120 and 130 may be releasably fixed using a separate angle securing member.

The support plate 110 is disposed parallel to a lineation having line shapes arranged on the bedding plane 20 and parallel to the bedding plane 20, and the second rotation plate 130 is horizontally disposed, the rotation angle of the first rotation plate 120 with respect to the support plate 110 may be determined to measure a rake angle that is an angle between the strike of the bedding plane 20 and the line structure.

Also, when the support plate 110 is disposed parallel to the lineation and perpendicular to the bedding plane 20 on the bedding plane 110, and the second rotation plate 130 is horizontally disposed, the rotation angle of the first rotation plate 120 with respect to the support plate 110 may be measured to measure plunge that is an angle between the horizontal plane and the line structure.

Auxiliary plates 160 are mounted in a posture parallel and pivotally connected to the support plate 110. The auxiliary plates 160 may be disposed on each of two edges of the support plate 110. The auxiliary plates 160 may assist the support plate 110 so that the support plate 110 is disposed parallel to the bedding plane 20. For example, as shown in FIG. 4, when only a portion of the bedding plane 20 is exposed so that the support plate 110 does not stably contact the bedding plane 20, the auxiliary plates 160 may be unfolded so that the support plate 110 and an auxiliary plate 160 contacts the bedding plane 20 at the same time. Thus, even though only a portion of the bedding plane 20 is exposed, the support plate 110 may be disposed parallel to the bedding plane 20.

The apparatus 100 for measuring strike and dip is operable to measure the strike and dip of the bedding plane 20 at the same time. Also, in the apparatus 100 for measuring strike and dip, since the support plate 110 may be disposed parallel to the bedding plane 20, strike and dip of the bedding plane 20 may be precisely and reproducibly measured. Also, in the apparatus 100 for measuring the strike and dip, even though only a portion of the bedding plane 20 is exposed, the support plate 110 may be disposed parallel to the bedding plane 20 using the auxiliary plates 160 as shown in FIG. 6.

The apparatus 100 for measuring strike and dip may also be used for measuring rake angle and plunge of lineation.

Method for Measuring Strike and Dip

In operation the apparatus 100 for measuring strike and dip is seated on the bedding plane 20 so that the bedding plane 20 and the support plate 110 are parallel to each other. When only a portion of the bedding plane 20 is exposed, the support plate 110 is disposed parallel to the bedding plane 20 using an auxiliary plate 160.

Thereafter, the first and second rotation plates 120 and 130 are rotated and pivoted to dispose the second rotation plate 130 in a horizontal state with the imaginary central longitudinal axis of the hinge 122 perpendicular to the direction of gravity as shown in FIG. 5. The second rotation plate 130 angles are as confirmed using the X-Y level gauge 154.

A direction of an intersection between the first and second rotation plates 120 and 130 may be measured using the compass 152 on the basis of a magnetic North to measure the strike of the bedding plane 20. Also, an angle between the first and second rotation plates 120 and 130 may be measured using the protractor 140 to measure the dip of the bedding plane 20.

Auxiliary Apparatus

Figure 7:
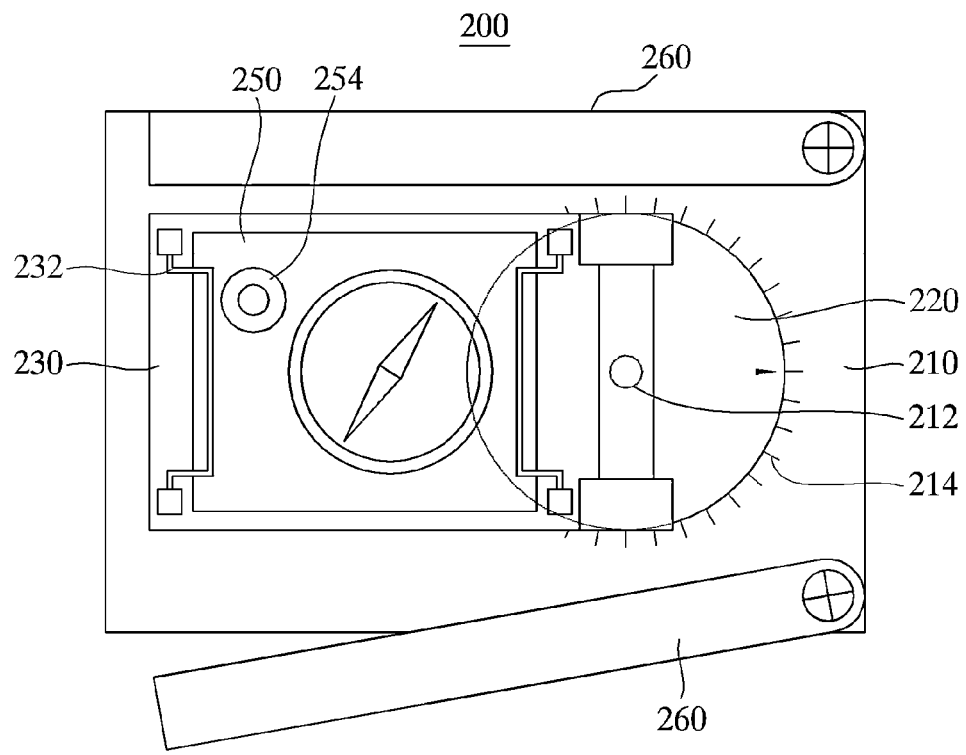
FIG. 7 is a plan view of an auxiliary apparatus for measuring strike and dip in accordance with an exemplary embodiment.
Figure 8:
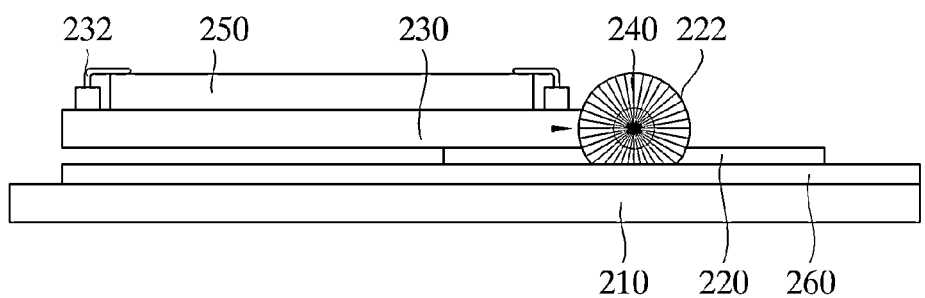
FIG. 8 is a side view of the auxiliary apparatus for measuring strike and dip shown in FIG. 7.

FIG. 7 is a plan view of an auxiliary apparatus for measuring strike and dip in accordance with an exemplary embodiment. FIG. 8 is a side view of an auxiliary apparatus for measuring strike and dip shown in FIG. 7.

Referring to FIGS. 7 and 8, an apparatus 200 for measuring strike and dip includes a support plate 210, a first rotation plate 220, a second rotation plate 230, a protractor 240, and an auxiliary plate 260.

Since the first rotation plate 220, the second rotation and pivot plate 230, the protractor 240, and the auxiliary plate 260 have substantially the same structure as those of the first rotation plate 120, the second rotation plate 130, the protractor 140, and the auxiliary plate 160 described with reference to FIGS. 3 to 6, their detailed description will not be repeated.

Additionally, the second rotation plate 230 supports a measuring unit 250 for measuring strike of a bedding plane and a horizontal posture of the second rotation plate 230.

The measuring unit 250 may include a compass for measuring strike angle of the bedding plane 20 and an X-Y level gauge 254 for measuring the horizontal posture of the second rotation plate 230 in a posture with the axis of the hinge between the first and second plates perpendicular to a line of gravity. The compass and the level gauge may be integrated or separated from each other.

Alternatively, the measuring unit 250 may include a compass application for measuring the strike of the bedding plane and a mobile phone in which a level gauge application for measuring the horizontal posture of the second rotation plate 230 is installed.

When the second rotation plate 230 is horizontally disposed, the measuring unit 250 is operable to measure a direction of an intersection between the first rotation plate 220 and the second rotation and pivot plate 230. Since the bedding plane 20 and the first rotation plate 220 are parallel to each other, and a horizontal plane and the second rotation plate 230 are parallel to each other, the direction of the intersection between the first and second rotation plates 220 and 230 is equal to the strike line of the bedding plane 20. Thus, the direction of the intersection between the first rotation plate 220 and the second rotation plate 230 may be measured using the measuring unit 250 on the basis of a magnetic North to measure the strike of the bedding plane 20.

Also, the measuring unit 250 may be disposed on the second rotation plate 230 to precisely confirm the horizontal and rotation orientation of the second rotation and pivot plate 230.

The second rotation plate 230 may further include an attachment member 232 for securing the measuring unit 250. The attachment member 232 operably secures the measuring unit 250 to prevent the measuring unit 250 placed on the second rotation plate 230 from be separated from the second rotation plate 230. The attachment member 232 may have various mechanical forms such as, for example, a clamp and a clip.

Also, the second rotation plate 230 may further include a groove (not shown) for receiving and securing the measuring unit 250. Since the measuring unit 250 is received in the groove, the measuring unit 250 may be precisely seated on the second rotation plate 230 to more firmly fix the measuring unit 250 with respect to the second rotation plate 230.

The apparatus 200 for measuring the strike and dip may include the measuring unit 250 for measuring the strike of the bedding plane and the horizontal posture of the second rotation plate 230 to measure strike and dip of the bedding plane 20 at the same time. Also, in the apparatus 200 for measuring strike and dip, since the support plate 210 may be disposed parallel to the bedding plane, the strike and dip of the bedding plane may be precisely and reproducibly measured. In the apparatus 200 for measuring strike and dip, even though only a portion of the bedding plane 20 is exposed, the support plate 210 may be disposed parallel to the bedding plane 20 using the auxiliary plate 260.

The apparatus 200 for measuring the strike and dip may also be used for measuring rake angle and plunge of the lineation.

The process for measuring strike and dip of the bedding plane 20 using the apparatus 200 for measuring strike and dip may be performed with the same process as the apparatus 100 for measuring strike and dip, after the measuring unit 250 is mounted on the second rotation and pivot plate 230.

As described above, an apparatus 100 for measuring strike and dip and an auxiliary apparatus 200 may measure strike and dip of the bedding plane 20 at the same time using an angle of a compass and an angle between the first and second rotation plates when the second rotation plate is horizontally disposed. Also, in the apparatus for measuring strike and dip and the auxiliary apparatus, since the support plate is stably disposed on the bedding plane, the strike and dip of the bedding plane may be reproducibly and conveniently measured.

Although the exemplary embodiments have been described with reference to the specific embodiments, they are not limited thereto. Therefore, it will be readily understood by those skilled in the art that various modifications and changes can be made thereto without departing from the spirit and scope of the present disclosure defined by the appended claims.

What is claimed is:

1. An apparatus for measuring strike and dip of a geologic formation, the apparatus comprising:
   a support plate;
   a first rotation plate connected to the support plate and positioned parallel to the support plate, the first rotation plate being rotatable parallel to the support plate;
   a second rotation plate hinge-coupled to the first rotation plate, the second rotation plate being rotatable about a hinge shaft;
   a protractor configured to read an angle between the first rotation plate and the second rotation plate; and
   a measuring unit comprising a compass disposed on the second rotation plate.

2. The apparatus of claim 1, wherein the measuring unit further comprises:
   a level gauge configured to confirm a horizontal posture of the second rotation plate in a posture with an imaginary central longitudinal axis of the hinge shaft perpendicular to the direction of gravity.

3. The apparatus of claim 1, wherein the protractor is disposed on a side surface of the hinge shaft.

4. The apparatus of claim 1, wherein the support plate has graduations along a circumference of the first rotation plate to determine a rotation angle of the first rotation plate with respect to the support plate.

5. The apparatus of claim 1, further comprising:
   an auxiliary plate disposed parallel and rotatably connected to the support plate, the auxiliary plate being configured to assist the support plate so that the support plate is disposed parallel to a bedding plane.

6. An apparatus for measuring strike and dip of a geologic formation, the apparatus comprising:
   a support plate;
   a first rotation plate disposed on the support plate in a posture parallel to the support plate, the first rotation plate being rotatable parallel to the support plate;
   a second rotation plate hinge-coupled to the first rotation plate and being operable for rotation about a hinge shaft, the second rotation plate being configured to support a measuring unit; and
   a protractor connected to the hinge shaft and being vertically disposed with respect to the first rotation plate, the protractor being configured to determine an angle between the first rotation plate and the second rotation plate.

7. The apparatus of claim 6, wherein the protractor is disposed on a side surface of the hinge shaft.

8. The apparatus of claim 6, wherein the support plate has graduations along a circumference of the first rotation plate to determine a rotation angle of the first rotation plate with respect to the support plate.

9. The apparatus of claim 6, further comprising an auxiliary plate disposed parallel and rotatably connected to the support plate, the auxiliary plate being configured to assist the support plate so that the support plate is disposed parallel to a bedding plane.

10. The apparatus of claim 6, wherein the second rotation plate further comprises an attachment member configured to secure the measuring unit to the second rotation plate.

11. The apparatus of claim 6, wherein a measuring unit is operably connected to the second rotation plate and the measuring unit including a compass.

12. The apparatus of claim 11, wherein the measuring unit further includes an X-Y level mechanism operable to indicate that the second rotation plate is level and an imaginary central longitudinal axis of the hinge shaft is normal to the direction of gravity.

* * * * *